United States Patent Office 3,014,053
Patented Dec. 19, 1961

3,014,053
PROCESS FOR PRODUCING DERIVATIVES OF VITAMIN A ALDEHYDE AND PRODUCTS THEREOF
Waldemar Guex, Bottmingen, Otto Isler, Basel, Rudolf Rüegg, Bottmingen, and Gottlieb Ryser, Basel, Switzerland, assignors to Hoffmann-La Roche Inc., Nutley, N.J., a corporation of New Jersey
No Drawing. Filed Aug. 24, 1959, Ser. No. 835,410
Claims priority, application Great Britain Aug. 28, 1958
6 Claims. (Cl. 260—410.9)

This invention relates to a method for producing derivatives of vitamin A aldehyde. More particularly, the invention relates to a process for the production of polyene carboxylic acids derived from vitamin A aldehyde containing 22, 25, 27 and 30 carbon atoms and alkyl esters of such acids.

The process of this invention comprises condensing vitamin A aldehyde [3,7-dimethyl-9-(2,6,6-trimethyl-1-cyclohexen-1-yl)-2,4,6,8-nonatetraen-1-al] with a triarylphosphorane of the group consisting of carbalkoxymethylene-triarylphosphorane, 3-carbalkoxy-2-buten-1 - ylidene-triarylphosphorane, 3-methyl-5-carbalkoxy-2,4-pentadien-1-ylidene-triarylphosphorane and 3-methyl-7-carbalkoxy-2,4,6-octatrien-1-ylidene-triarylphosphorane and decomposing the adduct formed as a product of the condensation. The product of these reactions is a long chain, ester derivative of vitamin A aldehyde. The ester thus produced may be converted to the corresponding polyene carboxylic acid by saponification.

In the first step of the process, wherein vitamin A aldehyde is condensed with one of the phosphoranes described above, approximately equivalent proportions of the reactants or an excess of the phosphorane are used. The condensation may be effected by admixing the reactants at room temperature, preferably in an inert organic solvent such as ether, petroleum ether, benzene, methylene chloride, dioxane or tetrahydrofuran and in an atmosphere in which air has been displaced with an inert gas such as nitrogen. Methylene chloride is particularly useful as the solvent.

The adduct which results from the condensation reaction will gradually decompose upon standing for some time at room temperature into the desired polyene carboxylic acid ester and triarylphosphine oxide. Heating accelerates the decomposition of the adduct. Preferably the product of the condensation reaction is refluxed for several hours in methylene chloride solution.

The esters obtained as described above may be converted to the corresponding acid by saponification, preferably in an inert solvent such as ether. An alkali metal hydroxide, preferably sodium hydroxide, in a medium such as alcohol, may be added at room temperature to accomplish this end. Here too it is preferable to work in an inert atmosphere.

The triarylphosphoranes which constitute one reactant in the process of this invention have the formula

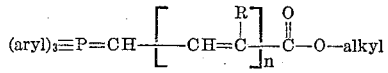

wherein $n$ represents an integer from 0 to 3 and R, beginning with methyl, represents alternately methyl or hydrogen.

They may be produced from the corresponding phosphonium halide having the formula

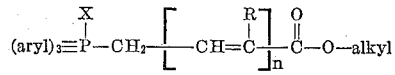

wherein $n$ and R have the same meaning as above and X represents halogen, by reacting the phosphonium halide with a metallo organic compound, for example, phenyl lithium or butyl lithium, or with an alkali metal alcoholate, for example, sodium methylate, to split out hydrogen halide. Preferably this reaction is effected in an inert organic solvent such as ether, alcohol, or especially methylene chloride, excluding oxygen from the vessel. One particularly advantageous mode of operation is to produce the triarylphosphorane in situ by reacting the phosphonium halide with the metallo organic compound as just described and then to add the vitamin A aldehyde directly to the reaction mixture.

The triaryl-phosphonium halides may be produced by condensing the appropriate halogenated acid ester, e.g. γ-halotiglic alkyl ester, with a triarylphosphine, e.g. triphenylphosphine, in an inert solvent such as benzene.

The reaction of vitamin A aldehyde with carbalkoxymethylene - triarylphosphorane produces 5,9-dimethyl-11-(2,6,6-trimethyl - 1 - cyclohexen-1-yl)-2,4,6,8,10-undecapentaen-1-oic acid alkyl ester. Similarly the reaction of the aldehyde with 3-carbalkoxy-2-buten-1-ylidene-triarylphosphorane, 3-methyl-5-carbalkoxy-2,4-pentadien-1-ylidene-triarylphosphorane or 3-methyl-7 - carbalkoxy-2,4,6-octatrien-1-ylidene-triarylphosphorane produces, respectively, 2,7,11-trimethyl-13 - (2,6,6-trimethyl-1-cyclohexen-1-yl)-2,4,6,8,10,12-tridecahexaen-1-oic acid alkyl ester, 4,9,13-trimethyl-15-(2,6,6-trimethyl-1-cyclohexen-1-yl)-2,4,6,8,10,12,14-pentadecaheptaen-1-oic acid alkyl ester or 2,6,11,15-tetramethyl-17-(2,6,6-trimethyl-1-cyclohexen-1-yl) - 2,4,6,8,10,12,14,16 - heptadecaoctaen-1-oic acid alkyl ester. When the esters are saponified, the corresponding acids, 5,9-dimethyl-11 - (2,6,6-trimethyl-1-cyclohexen-1-yl)-2,4,6,8,10-undecapentaen - 1 - oic acid, 2,7,11-trimethyl-13 - (2,6,6-trimethyl-1-cyclohexen-1-yl)-2,4,6,8,10,12-tridecahexaen-1-oic acid, 4,9,13 - trimethyl-15-(2,6,6-trimethyl-1-cyclohexen-1-yl) - 2,4,6,8,10,12,14-pentadecaheptaen-1-oic acid or 2,6,11,15-tetramethyl-17-(2,6,6-trimethyl-1-cyclohexen-1-yl) - 2,4,6,8,10,12,14,16-heptadecaoctaen-1-oic acid, respectively, are produced.

In the preceding discussion, the aryl groups in the phosphoranes include such monocyclic aryl and monosubstituted aryl radicals as phenyl, alkylphenyl, alkoxyphenyl and the like. Phenyl is the preferred aryl group. The alkyl groups and the alkyl moiety of the alkoxy groups, wherever these terms are used herein, include straight chain and branched chain aliphatic hydrocarbon groups such as methyl, ethyl, propyl, isopropyl, butyl, isobutyl, tertiary butyl, amyl, hexyl, cetyl, lauryl, octadecyl and the like, e.g. up to about 18 carbon atoms. Lower alkyl groups, especially methyl and ethyl, are preferred. The term "carbalkoxy" refers to the acyl radical —COOR[1], wherein R[1] represents an alkyl group such as those defined above. The halogen atom in the triaryl-phosphonium halide may be any of the four halogens.

The esters and acids obtained by the process of this invention are crystalline compounds varying in hue from yellow to red. They are useful as coloring agents for foods and feeds, especially for poultry feeds, in order to obtain a better coloring of the egg yolk as well as the skin, shank, beak, meat and fatty tissue. The compounds also have vitamin A activity.

The following examples are illustrative of the invention. All temperatures are expressed in degrees centigrade.

*Example 1*

7.5 g. of lithium were dissolved in 1000 ml. of liquid ammonia and acetylene was bubbled through the solution. Within 30 minutes a solution of 140 g. of β-acetyl-acrylic acid ethyl ester in 500 ml. absolute diethyl ether was added dropwise. One half of the ammonia was allowed to evaporate and 70 g. of ammonium chloride were added. Then the solution was diluted with 250 ml. of absolute diethyl ether and hydrolysed with 400 ml. of a saturated ammonium chloride solution. The aqueous layer was extracted with diethyl ether, the ether extracts collected, washed with saturated ammonium chloride solution, dried with sodium sulfate, filtered and then concentrated to dryness. There were obtained 135 g. of 1-carbethoxy-3-methyl-1-pentaen-4-yn-3-ol of $n_D^{23}=1.4710$. 168 g. of the acetylenic carbinol were mixed with 168 ml. of dihydropyran. 2 ml. of 84% phosphoric acid were added while stirring. The temperature of the solution is kept within 20 and 30° and the solution stored overnight at room temperature. The mixture is extracted with 300 ml. of diethyl ether and the extract washed to neutral reaction with a mixture of sodium chloride and sodium bicarbonate solution, then dried with sodium sulfate, filtered, concentrated and distilled in a Vigreux-column. There were obtained 200 g. of β-tetrahydropyranyl ether of B.P. 85–90°/0.05 mm. 252 g. of this product were hydrogenated in 500 ml. of petroleum ether (boiling range 40–60°) in the presence of 3 g. of Lindlar catalyst. There were obtained 250 g. of 1-carbethoxy-3-methyl-3-tetrahydropyranyloxy - 1,4-pentadiene; $n_D^{20}=1.4700$. This product was poured into 2000 ml. of dry diethyl ether and a solution of 38 g. of lithium aluminum hydride in 500 ml. of diethyl ether was added dropwise at a temperature of −20 to −10°. 500 ml. of water were added and the mixture dissolved in 1000 ml. of 18% aqueous acetic acid. The aqueous layer was extracted with 250 ml. of ether, the ether extract washed neutral with sodium bicarbonate solution, dried with sodium sulfate and the solvent evaporated. There were obtained 210 g. of 4-methyl-4-tetrahydropyranyloxy - 2,5 - hexadien-1-ol; $n_D^{22}=1.4820$; B.P. 85–90°/0.05 mm. 1000 g. of manganese dioxide were suspended in 4000 ml. of low boiling petroleum ether, 212 g. of the hexadienol were added and the mixture was allowed to react at room temperature for 4 hours. After filtration, drying with sodium sulfate and evaporating off the solvent, there were obtained 180 g. of 4-methyl-4-tetrahydropyranyloxy-2,5-hexadien-1,al; $n_D^{25}=1.4820$; absorption maximum at 220 mμ; $E_1^1=670$ (in ethanol). 100 g. of the hexadienal, 500 ml. of absolute benzene and 170 g. of (α-carbomethoxy-ethylidene)-triphenyl-phosphorane were refluxed for 5 hours. The solvent was eliminated in vacuo and the residue dissolved in 500 ml. of methanol. Then, there were added 125 ml. of water and 1000 ml. of petroleum ether (boiling range 40–50°) and the mixture was agitated. The aqueous methanolic layer was separated, the ether layer was washed consecutively with methanol and with water, dried with sodium sulfate and the petroleum ether evaporated. The product was a yellowish oil ($n_D^{23}=1.5170$), which was stirred in 430 ml. of ethanol. The temperature was kept under 5° and 250 ml. of 62% hydrobromic acid were added. After stirring for two hours at 0–5°, the mixture was poured on 1000 ml. of ice water. The product was extracted with 500 ml. of petroleum ether, the extract washed with water to neutral reaction, dried with calcium chloride and the solvent evaporated in vacuo at 20–25°. The product obtained (135 g.) was 3-methyl-7 - carbomethoxy - 2,4,6 - octatrien - 1 - yl bromide; $n_D^{24}=1.5430$; absorption maximum at 300 mμ; $E_1^1=950$ (in petroleum ether). This product was dissolved in 600 ml. of benzene. 120 g. of triphenyl phosphine were added and the mixture was agitated until dissolution was complete. On storing overnight, the product crystallizes. The crystals are collected by filtration under suction, washed with benzene and then with petroleum ether (boiling range 40–50°). After drying in vacuo at 50° there were obtained 138 g. of 3-methyl-7-carbomethoxy-2,4,6-octatrien-1-yl-triphenyl-phosphonium bromide.

9 ml. of 2 N sodium methylate in methanol solution were added to 10 g. of 3-methyl-7-carbomethoxy-2,4,6-octatrien-1-yl-triphenyl-phosphonium bromide in 100 ml. of dry methylene chloride in a nitrogen atmosphere with stirring, to obtain 3-methyl-7-carbomethoxy-2,4,6-octatrien-1-ylidene-triphenylphosphorane. Then 6 g. of vitamin A aldehyde in 50 ml. of methylene chloride were added gradually. The mixture was boiled under reflux for 5 hours, then filtered. The methylene chloride filtrate was washed with water, dried over sodium sulfate, and passed through a column containing 50 g. of aluminum oxide (activity stage I, deactivated with 4% water). The solution collected from the aluminum oxide column was concentrated and methanol was slowly added until crystallization began. There were obtained orange-red crystals of 2,6,11,15-tetramethyl-17-(2,6,6-trimethyl-1-cyclohexen-1-yl) - 2,4,6,8,10,12,14,16 - heptadecaoctaen-1-oic acid methyl ester M.P. 136–137°, U.V. absorption maxima at 445 and 471 mμ, $E_1^1=2575$ and 2160 (in petroleum ether).

1 g. of the ester obtained above was saponified by stirring in 300 ml. of ether with 300 ml. of 10% methanolic potassium hydroxide solution for 2 days at 20° in a nitrogen atmosphere. The mixture was then diluted with water and extracted with ether. The ether solution was filtered and the precipitate was added to water, acidified with dilute hydrochloric acid and filtered. The product, 2,6,11,15-tetramethyl-17-(2,6,6 - trimethyl-1-cyclohexen-1-yl) - 2,4,6,8,10,12,14,16 - heptadecaoctaen-1-oic acid, was recrystallized from benzene, M.P. 189–190°; absorption maximum at 448 mμ; $E_1^1=2515$, with a shoulder at 472 mμ (in petroleum ether).

*Example 2*

By the same procedure described in Example 1, 16.7 g. of carbomethoxymethyl-triphenyl-phosphonium bromide in 90 ml. of dry methylene chloride were treated with 20.6 ml. of 2 N sodium methylate in methanol solution to produce carbomethoxymethylene-triphenylphosphorane. 10 g. of vitamin A aldehyde in 90 ml. of methylene chloride were added slowly and the product was worked up also as described in Example 1. All-trans-5,9-dimethyl - 11 - (2,6,6-trimethyl-1-cyclohexen-1-yl)-2,4,6,8,10-undecapentaen-1-oic acid methyl ester was obtained in the form of yellow crystals, M.P. 85–86°; U.V. absorption maximum at 374–378 mμ, $E_1^1=1795$ (in petroleum ether).

The ester obtained above may be saponified according to the method described in Example 1 to produce all-trans - 5,9 - dimethyl-11-(2,6,6-trimethyl-1-cyclohexen-1-yl)-2,4,6,8,10-undecapentaen-1-oic acid.

We claim:

1. A process which comprises reacting vitamin A aldehyde with a member of the group consisting of carbalkoxymethylene-triarylphosphorane, 3 - carbalkoxy - 2-buten - 1 - ylidene - triarylphosphorane, 3 - methyl - 5-carbalkoxy - 2,4 - pentadien - 1 - ylidene-triarylphosphorane and 3 - methyl - 7 - carbalkoxy - 2,4,6 - octatrien-1-ylidene-triarylphosphorane and permitting the resulting adduct to decompose to produce, respectively, a member of the group consisting of 5,9-dimethyl-11-(2,6,6-trimethyl - 1 - cyclohexen - 1 - yl) - 2,4,6,8,10 - undecapentaen-1-oic acid alkyl ester, 2,7,11-trimethyl-13-(2,6,6 - trimethyl - 1 - cyclohexen - 1 - yl) - 2,4,6,8,10,12-tridecahexaen-1-oic acid alkyl ester, 4,9,13-trimethyl-15-(2,6,6 - trimethyl - 1 - cyclohexen - 1 - yl) - 2,4,6,8,10,12,14-pentadecaheptaen-1-oic acid alkyl ester and 2,6,11,15 - tetramethyl - 17 - (2,6,6 - trimethyl - 1 - cyclohexen-1 - yl) - 2,4,6,8,10,12,14,16 - heptadecaoctaen - 1 - oic acid alkyl ester.

2. A process which comprises reacting vitamin A aldehyde with a member of the group consisting of carbalkoxymethylene-triarylphosphorane, 3 - carbalkoxy - 2-buten - 1 - ylidene-triarylphosphorane, 3 - methyl - 5-carbalkoxy - 2,4 - pentadien - 1 - ylidene-triarylphosphorane and 3-methyl-7-carbalkoxy-2,4,6-octatrien-1-ylidene-triarylphosphorane, permitting the resulting adduct to decompose to produce, respectively, a member of the group consisting of 5,9-dimethyl-11-(2,6,6-trimethyl-1-cyclohexen-1-yl)-2,4,6,8,10-undecapentaen-1-oic acid alkyl ester, 2,7,11 - trimethyl - 13 - (2,6,6 - trimethyl - 1 - cyclohexen - 1 - yl) - 2,4,6,8,10,12 - tridecahexaen - 1 - oic acid alkyl ester, 4,9,13-trimethyl-15-(2,6,6-trimethyl-1-cyclohexen - 1 - yl) - 2,4,6,8,10,12,14 - pentadecaheptaen-1-oic acid alkyl ester and 2,6,11,15-tetramethyl-17-(2,6,6 - trimethyl - 1 - cyclohexen - 1 - yl) - 2,4,6,8,10,12,14,16-heptadecaoctaen-1-oic acid alkyl ester and saponifying the ester to produce, respectively, a member of the group consisting of 5,9-dimethyl-11-(2,6,6-trimethyl-cyclohexen-1 - yl) - 2,4,6,8,10 - undecapentaen - 1 - oic acid, 2,7,11-trimethyl - 13 - (2,6,6 - trimethyl - 1 - cyclohexen - 1-yl)-2,4,6,8,10,12-tridecahexaen-1-oic acid, 4,9,13-trimethyl - 15 - (2,6,6 - trimethyl - 1 - cyclohexen - 1 - yl) - 2,4,6,8,10,12,14-pentadecaheptaen-1-oic acid and 2,6,11,15-tetramethyl - 17 - (2,6,6 - trimethyl - 1 - cyclohexen - 1-yl)-2,4,6,8,10,12,14,16-heptadecaoctaen-1-oic acid.

3. A process which comprises reacting vitamin A aldehyde with 3-methyl-7-carbomethoxy-2,4,6-octatrien-1-ylidene-triphenylphosphorane and heating the reaction product to produce 2,6,11,15-tetramethyl-17-(2,6,6-trimethyl - 1 - cyclohexen - 1 - yl) - 2,4,6,8,10,12,14,16-heptadecaoctaen-1-oic acid methyl ester.

4. A process which comprises reacting vitamin A aldehyde with carbomethoxymethylene-triphenylphosphorane and heating the reaction product to produce 5,9-dimethyl-11 - (2,6,6 - trimethyl - 1 - cyclohexen - 1 - yl) - 2,4,6,8,10-undecapentaen-1-oic acid methyl ester.

5. 5,9 - dimethyl - 11 - (2,6,6 - trimethyl - 1 - cyclohexen - 1 - yl) - 2,4,6,8,10 - undecapentaen - 1 - oic acid alkyl ester.

6. 5,9 - dimethyl - 11 - (2,6,6 - trimethyl - 1 - cyclohexen - 1 - yl) - 2,4,6,8,10 - undecapentaen - 1 - oic acid methyl ester.

References Cited in the file of this patent
UNITED STATES PATENTS

| | | |
|---|---|---|
| 2,917,523 | Pommer et al. | Dec. 15, 1959 |
| 2,917,524 | Pommer et al. | Dec. 15, 1959 |

UNITED STATES PATENT OFFICE
CERTIFICATE OF CORRECTION

Patent No. 3,014,053            December 19, 1961

Waldemar Guex et al.

It is hereby certified that error appears in the above numbered patent requiring correction and that the said Letters Patent should read as corrected below.

Column 5, line 10, for "trimethyl-cyclohexen-" read -- trimethyl-1-cyclohexen- --.

Signed and sealed this 24th day of July 1962.

(SEAL)
Attest:

ERNEST W. SWIDER
Attesting Officer

DAVID L. LADD
Commissioner of Patents